Patented June 21, 1927.

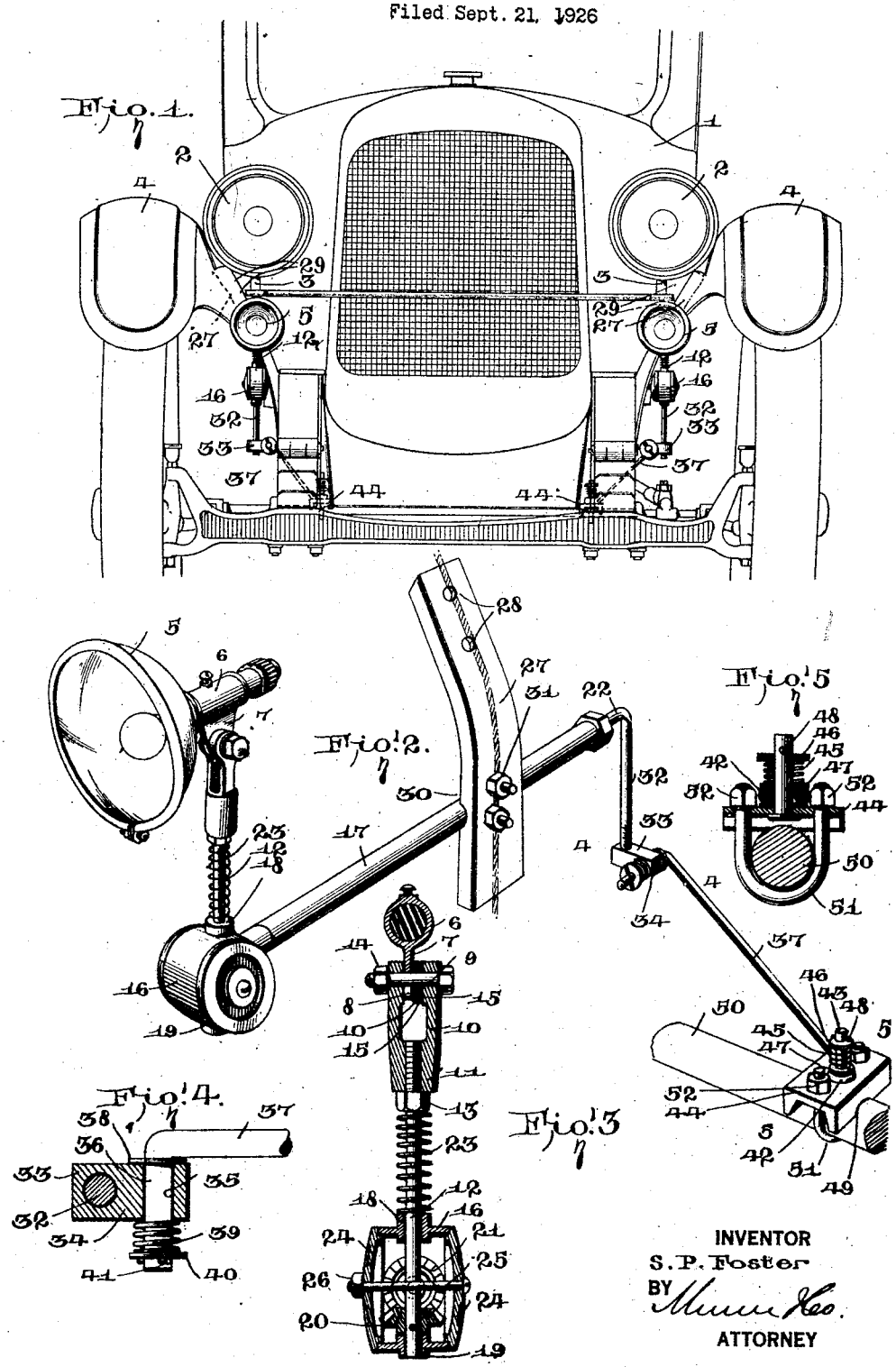

1,633,442

UNITED STATES PATENT OFFICE.

SAMUEL PENN FOSTER, OF CHATTANOOGA, TENNESSEE, ASSIGNOR TO ROBERT C. LYNN, OF CHATTANOOGA, TENNESSEE.

DIRIGIBLE HEADLIGHT.

Application filed September 21, 1926. Serial No. 136,836.

My invention relates generally to headlight apparatus for automobiles, and more particularly to an auxiliary headlamp or spot light which can be used in conjunction with the main stationary headlights and which is connected with the steering mechanism of the automobile so as to swing in unison with the steering wheels of the automobile.

The invention consists in the combinations, constructions and arrangements herein described and claimed.

The object of the invention is the provision of a novel mounting and operating mechanism for a spot light of the character described so that the spot light will be supported below the level of the associated main headlight and so that the rays of light from the spot light will illuminate the roadway directly in front of the associated front wheel of the automobile, both when the automobile is moving in a straight course or is turning a corner.

A further object of the invention is the provision of a spot light supporting and operating mechanism which affords facilities for the adjustment of the spot light fore-and-aft and which also permits tilting of the spot light to adjust the rays of light therefrom vertically.

A still further object of the invention is the provision of a spot light supporting and operating mechanism which can be adjusted to vary the extent of lateral swinging movement of the spot light that will be effected by a given longitudinal movement of the tie rod of the steering mechanism with which the spot light supporting and operating mechanism is connected.

A still further object of the invention is the provision of a spot light supporting and operating mechanism which is adapted to function with relatively little noise, if any, and without play between adjacent relatively moving parts thereof.

Other objects and advantages of the invention will be apparent from the following description, considered in conjunction with the accompanying drawings, in which:—

Figure 1 is a front view of an automobile equipped with a pair of spot lights and spot light supporting and operating mechanisms embodying the invention, Figure 2 is a perspective view of one of the spot lights and its supporting and actuating mechanism, Figure 3 is a vertical section through the mounting for the standard of one of the spot lights, Figure 4 is a relatively enlarged fragmentary section substantially along the line 4—4 of Figure 2, and Figure 5 is a section substantially along the line 5—5 of Figure 2.

In Figure 1 I show an automobile 1, having a pair of main headlights 2 which are carried by standards 3. The standards 3 are fixedly supported on the automobile 1 in any suitable known manner so that the main headlights 2 will be supported slightly inwardly of the front fenders 4.

In carrying out the invention, I provide an auxiliary head light or spot light 5 for one or each of the headlights 2. The spot light 5 has a tubular extension 6 at the rear of its casing from which an ear 7 depends. The ear 7 may have a vertical slot 8 (see Fig. 3) in its lower edge for engaging with a bolt 9 that extends through aligned transverse openings in a pair of upstanding ears 10 on a nut 11. The nut 11 is threadedly engaged with the upper end portion of a standard 12 and is locked in place on the standard 12 by a lock nut 13. The bolt 9 is threadedly engaged by a nut 14 and suitable spacing members, which may be lock washers 15, are provided on the bolt 9 between the ears 7 and the adjacent ear 10 so that the ears 7 will be firmly clamped in place between the ears 10 when the nut 14 has been tightened.

The supporting structure for the spot light also includes a housing having a substantially cylindrical body 16 that is integral with the forward end portion of a horizontal tubular supporting member 17. The housing body 16 is open at its opposite sides and has vertically alined bearings 18 and 19, respectively, in its top and bottom portions in which the lower end portion of the standard 12 is journaled.

A bevel gear 20 is secured to the lower end portion of the standard 12 within the housing body 16 and is in mesh with a bevel gear 21 that is secured to an actuating shaft 22. The gear 21 is disposed in the housing body 16 with its axis in a plane higher than the gear 20 and the actuating rod 22 is journaled in and extends through the tubular support 17. An expansion spring 23 is mounted on the standard 12 between the bearing 18 and the lock nut 13 and urges the standard 12 upwardly so that the gear 20 will be kept continuously in close mesh with the gear 21. The housing body 16 is closed at its sides by caps 24 which are held in place removably by a tie bolt 25 and a nut 26, the middle portion of the tie bolt 25 being bent to afford clearance for the adjacent portion of the standard 12.

The tubular support 17 is adjustably supported on a bracket 27 which has openings 28 in its upper end portion adapted for engagement with bolts 29 which are customarily provided on the automobile with which the invention is used, in conjunction with the supporting means for the associated main headlight, the bracket 27 being thereby connected rigidly with a front fender 4 of the automobile. The lower end portion of the bracket 27 has vertically spaced transverse openings for the reception of the members of a U-bolt 30 which embraces the tubular supporting member 17 and it is obvious that the supporting member 17 will be clamped firmly to the bracket 27 when the nuts 31 are tightened on the end portions of the U-bolt 30 against the bracket 27, as shown in Figure 2. When the nuts 31 have been loosened, the tubular supporting member 17 can be adjusted longitudinally which will shift the associated spot light in a direction fore-or-aft of the automobile.

The actuating shaft 22 is a rock shaft and has a depending rocker arm 32 at its rearward end. A nut 33 is threadedly engaged with the lower end portion of the rocker arm 32 and has a laterally extending portion 34 formed with a transverse opening 35 in which the laterally turned end portion 36 of a control rod 37 is journaled. Preferably, a thrust washer 38 is placed on the end 36 of the control rod 37 between the main portion of the control rod and the extending portion 34 of the nut. The laterally turned end portion 36 of the control rod is held against play in the opening 35 by virtue of the action of an expansion spring 39 that encircles the part 36 of the control rod between a washer 40 and the adjacent portion of the nut 33—34, the washer 40 being held in place by a cotter pin 41 and the laterally turned portion 36 of the control arm thus being retained in place in the opening 35.

The nut 33 can be adjusted vertically on the rocker arm 32 to vary the swinging of the spot light 5 that will be effected by a given longitudinal movement of the associated control arm 37.

The second end of the control arm 37 is formed to produce an eye 42 which loosely encircles a stud 43 on a substantially channel shaped clamping plate 44. An expansion spring 45, which is located between washers 46 and 47, respectively, on the stud 43 tends to maintain the eye member 42 against the clamping plate 44 and yieldingly permits limited universal movement of the control arm relatively to the clamp plate 44. The spring 45 and the washers 46 and 47 are retained in place on the stud 43 by a cotter pin 48.

The clamp 44 has curved notches in the edges of its flanges, as at 49, for partially embracing the cross connecting or tie rod 50 of the steering mechanism of the automobile and the clamping plate 44 is secured to the tie rod 50 by a U-bolt 51 and nuts 52, the members of the U-bolt extending through openings in the web of the clamping plate 44 and the U-bolt embracing the tie rod 50, as clearly shown in Figures 2 and 5.

From the foregoing description of the various parts of the device, the operation thereof may be readily understood. Spot lights 5 and the hereinbefore described supporting and operating mechanism therefor may be provided in association with both the main headlights of the automobile as shown in Figure 1. The bracket 27 may vary considerably in shape and in immaterial details according to the particular construction of the automobile that is equipped with spot lights embodying the invention. The longitudinal shifting of the tie rod 50 that will take place when the front wheels of the automobile are turned from a straight course will cause rocking of the shaft 22 of each spot light supporting and actuating mechanism and that the associated spot light will be swung about the axis of its standard 12 in unison with the front wheels of the automobile. The nut 14 at the upper end of the standard for the spot light can be loosened to permit tilting of the spot light casing about a horizontal axis to adjust vertically the direction of the beam that will be projected from the spot light. The light emitting element of the spot light may be of any suitable construction and may be connected by wires, not shown, which may extend through the tubular portion 6 of the spot light case to any suitable source of electric current supply, as for example, to the electric current supply means for the main headlights.

Obviously the invention is susceptible of embodiment in forms other than that which is illustrated in the accompanying drawings and I therefore consider as my own all such modifications and adaptations as fairly fall within the scope of the appended claims.

I claim:—

1. In a dirigible spot light arrangement for a motor vehicle, a bracket attachable to a stationary part of the motor vehicle at the front of the latter, a tubular supporting member attached to said bracket and extending in the direction of length of the motor vehicle, a housing body at the forward end of said tubular supporting member, said housing body having vertically alined bearings, a standard journaled in said alined bearings and having a portion extending through said housing body, a spot light supported on said standard, an actuating shaft extending through said tubular supporting member into said housing body, meshed gears within said housing body and secured to the adjacent ends of said standard and said actuating shaft, respectively, and a motion transmitting connection between the actuating shaft and the tie rod of the steering mechanism of the motor vehicle.

2. In a dirigible spot light arrangement for a motor vehicle, a bracket attachable to a stationary part of the motor vehicle at the front of the latter, a tubular supporting member attached to said bracket and extending in the direction of length of the motor vehicle, a housing body at the forward end of said tubular supporting member, said housing body having vertically alined bearings, a standard journaled in said alined bearings and having a portion extending through said housing body, a spot light supported on said standard, an actuating shaft extending through said tubular supporting member into said housing body, meshed gears within said housing body and secured to the adjacent ends of said standard and said actuating shaft, respectively, a motion transmitting connection between the actuating shaft and the tie rod of the steering mechanism of the motor vehicle, and spring means associated with said standard and acting to maintain said gears in close mesh with each other.

3. In a dirigible spot light arrangement for a motor vehicle, a bracket attachable to a stationary part of the motor vehicle at the front of the latter, a tubular supporting member attached to said bracket and extending in the direction of length of the motor vehicle, a housing body at the forward end of said tubular supporting member, said housing body having vertically alined bearings, a standard journaled in said alined bearings and having a portion extending through said housing body, a spot light supported on said standard, an actuating shaft extending through said tubular supporting member into said housing body, meshed gears within said housing body and secured to the adjacent ends of said standard and said actuating shaft, respectively, a motion transmitting connection between the actuating shaft and the tie rod of the steering mechanism of the motor vehicle, said housing body being open at its side, closures for the open sides of said housing body, and means for releasably maintaining said closure members in place on said housing body.

4. In a dirigible spot light arrangement for a motor vehicle, a bracket attachable to a stationary part of the motor vehicle at the front of the latter, a tubular supporting member attached to said bracket and extending in the direction of length of the motor vehicle, a housing body at the forward end of said tubular supporting member, said housing body having vertically alined bearings, a standard journaled in said alined bearings and having a portion extending through said housing body, a spot light supported on said standard, an actuating shaft extending through said tubular supporting member into said housing body, meshed gears within said housing body and secured to the adjacent ends of said standard and said actuating shaft, respectively, a motion transmitting connection between the actuating shaft and the tie rod of the steering mechanism of the motor vehicle, said spot light being supported on said standard for swinging adjustment about a horizontal axis extending at right angles with the direction of length of the motor vehicle.

5. In a supplementary headlight arrangement for motor vehicles, a standard mounted to turn about a vertical axis, an auxiliary headlight supported on said standard, an actuating shaft having a motion transmitting connection with said standard, said actuating shaft extending rearwardly from the lower end of said standard in a direction parallel to the direction of length of the motor vehicle with which the supplementary headlight element is used, means for rotatably supporting the actuating shaft, said actuating shaft having a down turned rocker arm, a nut adjustably engaged with said rocker arm, a control arm swivelly connected with said nut, a clamp adjustably engageable with the cross tie rod of the steering mechanism of the motor vehicle, and a fixed motion transmitting mechanism between said clamp and said control arm.

6. In an operating mechanism for a dirigible head-light, an actuating shaft mounted to turn about an axis extending parallel with the direction of length of a motor vehicle on which the headlight operating mechanism is used, a rocker arm carried by said actuating shaft, a clamp adjustably engageable with the cross tie rod of the steering mechanism of the motor vehicle, and a control arm adjustably connected at one end with said rocker arm, and having a flexible motion transmitting connection at its opposite end with said clamp.

7. In an operating mechanism for a dirigible head-light, an actuating shaft mounted to turn about an axis extending parallel with the direction of length of a motor vehicle on which the headlight operating mechanism is used, a rocker arm carried by said actuating shaft, a clamp comprising a clamping member, fastening means for securing said clamping member on the tie rod of the steering mechanism of the motor vehicle, said clamping member having a stud upstanding therefrom, a control arm having an eye at one end loosely disposed on said stud, spring pressed means tending to hold said eye member against said clamping member, a nut adjustably engaged with said rocker arm, and means providing a pivotal connection between said nut and the said control arm.

8. In an operating mechanism for a dirigible head-light, an actuating shaft mounted to turn about an axis extending parallel with the direction of length of a motor vehicle on which the headlight operating mechanism is used, a rocker arm carried by said actuating shaft, a clamp comprising a clamping member, fastening means for securing said clamping member on the tie rod of the steering mechanism of the motor vehicle, said clamping member having a stud upstanding therefrom, a control arm having an eye at one end loosely disposed on said stud, spring pressed means tending to hold said eye member against said clamping member, a nut adjustably engaged with said rocker arm, means providing a pivotal connection between said nut and the said control arm, and spring means associated with said last named means for preventing play between said nut and said control arm.

SAMUEL PENN FOSTER.